US008490875B2

(12) United States Patent
Cooper

(10) Patent No.: US 8,490,875 B2
(45) Date of Patent: Jul. 23, 2013

(54) UNIVERSAL CREDIT CARD APPARATUS AND METHOD

(75) Inventor: J. Carl Cooper, Incline Village, NV (US)

(73) Assignee: Technology Licensing Corp, Carson City, NV (US)

(*) Notice: Subject to any disclaimer, the term of this patent is extended or adjusted under 35 U.S.C. 154(b) by 150 days.

(21) Appl. No.: 12/877,335

(22) Filed: Sep. 8, 2010

(65) Prior Publication Data
US 2011/0028184 A1 Feb. 3, 2011

Related U.S. Application Data

(60) Continuation of application No. 12/273,485, filed on Nov. 18, 2008, now Pat. No. 7,828,207, which is a continuation of application No. 12/015,459, filed on Jan. 16, 2008, now Pat. No. 7,530,495, which is a continuation of application No. 11/372,254, filed on Mar. 8, 2006, now Pat. No. 7,334,732, which is a continuation of application No. 10/857,031, filed on May 28, 2004, now Pat. No. 7,083,094, which is a continuation of application No. 09/929,975, filed on Aug. 15, 2001, now Pat. No. 6,764,005, which is a division of application No. 09/109,312, filed on Jun. 30, 1998, now Pat. No. 6,308,890, which is a division of application No. 08/802,672, filed on Feb. 19, 1997, now Pat. No. 5,834,747, which is a continuation of application No. 08/334,474, filed on Nov. 4, 1994, now abandoned.

(51) Int. Cl.
*G06K 7/00* (2006.01)
(52) U.S. Cl.
USPC .......................................... 235/436

(58) Field of Classification Search
USPC ... 235/379, 380, 449, 492, 493, 436; 455/556.1
See application file for complete search history.

(56) References Cited

U.S. PATENT DOCUMENTS

| | | | | |
|---|---|---|---|---|
| 2,590,091 A | * | 3/1952 | Devol | 235/449 |
| 2,908,278 A | * | 10/1959 | Goerlich | 235/449 |
| 3,453,598 A | * | 7/1969 | Schweizer | 235/493 |
| 3,771,128 A | * | 11/1973 | Boardman | 235/462 |
| 3,874,586 A | * | 4/1975 | Foote et al. | 235/449 |

(Continued)

FOREIGN PATENT DOCUMENTS

| | | |
|---|---|---|
| EP | 0251253 A1 | 7/1988 |
| JP | 64-069394 A | 3/1989 |
| JP | 160880 | 6/1995 |
| WO | WO 88/03294 A1 | 5/1988 |

OTHER PUBLICATIONS

Petition to withdraw U.S. Appl. No. 12/273,485 from issue and suspend Oct. 27, 2010.*
Petition Decision Nov. 1, 2010 U.S. Appl. No. 12/273,485.*

(Continued)

*Primary Examiner* — Seung Lee
(74) *Attorney, Agent, or Firm* — Clifford Kraft

(57) ABSTRACT

The apparatus and method described herein provides for creating multiple spatial patterns, such as magnetic patterns on credit cards. The invention includes storage of information from which patterns may be created, a pattern creation device for creating the spatial patterns, and control whereby the information which is stored is selectively utilized to cause the pattern creation. This allows multiple desired patterns to be simulated, allowing convenient replacement of a number of separate pattern carrying devices.

41 Claims, 3 Drawing Sheets

U.S. PATENT DOCUMENTS

| | | | | |
|---|---|---|---|---|
| 3,953,712 | A | * | 4/1976 | Horvath ..................... 235/449 |
| 4,158,433 | A | * | 6/1979 | Peterson |
| 4,239,151 | A | * | 12/1980 | Enser et al. ................ 235/449 |
| 4,358,761 | A | | 11/1982 | Iwasaki |
| 4,361,873 | A | | 11/1982 | Harper et al. |
| RE31,211 | E | * | 4/1983 | Whitehead ................ 235/449 |
| 4,403,869 | A | | 9/1983 | Crutcher |
| 4,529,870 | A | * | 7/1985 | Chaum ..................... 235/379 |
| 4,575,621 | A | | 3/1986 | Dreifus |
| 4,614,861 | A | * | 9/1986 | Pavlov et al. |
| 4,654,867 | A | | 3/1987 | Labedz et al. |
| 4,667,087 | A | | 5/1987 | Quintana |
| 4,701,601 | A | | 10/1987 | Francini et al. |
| 4,766,293 | A | * | 8/1988 | Boston ..................... 705/41 |
| 4,791,283 | A | * | 12/1988 | Burkhardt |
| 4,797,542 | A | | 1/1989 | Hara |
| 4,800,255 | A | | 1/1989 | Imran |
| 4,827,111 | A | | 5/1989 | Kondo |
| 4,837,800 | A | | 6/1989 | Freeburg et al. |
| 4,868,376 | A | * | 9/1989 | Lessin et al. .............. 235/492 |
| 4,903,327 | A | | 2/1990 | Raghuram |
| 4,905,186 | A | | 2/1990 | Fukui |
| 4,916,296 | A | | 4/1990 | Streck |
| 4,960,983 | A | * | 10/1990 | Inoue |
| 4,968,873 | A | * | 11/1990 | Dethloff et al. ............ 235/380 |
| 4,973,828 | A | | 11/1990 | Naruse et al. |
| 4,990,756 | A | | 2/1991 | Hoemann |
| 5,020,092 | A | | 5/1991 | Phillips et al. |
| 5,020,093 | A | | 5/1991 | Pireh |
| 5,055,662 | A | | 10/1991 | Hasegawa |
| 5,127,042 | A | | 6/1992 | Gillig et al. |
| 5,140,517 | A | * | 8/1992 | Nagata et al. .............. 705/41 |
| 5,151,684 | A | | 9/1992 | Johnsen |
| 5,153,842 | A | | 10/1992 | Dlugos, Sr. et al. |
| 5,180,902 | A | | 1/1993 | Schick et al. |
| 5,182,442 | A | | 1/1993 | Takahira |
| 5,189,287 | A | | 2/1993 | Parienti |
| 5,192,947 | A | | 3/1993 | Neustein |
| 5,221,838 | A | | 6/1993 | Gutman et al. |
| 5,247,565 | A | | 9/1993 | Joglekar et al. |
| 5,276,311 | A | | 1/1994 | Hennige |
| 5,359,183 | A | * | 10/1994 | Skodlar |
| 5,410,138 | A | * | 4/1995 | Martin ..................... 235/449 |
| 5,424,398 | A | * | 6/1995 | Middledorp et al. |
| 5,424,524 | A | * | 6/1995 | Ruppert ................... 235/383 |
| 5,434,398 | A | * | 7/1995 | Goldberg |
| 5,434,400 | A | * | 7/1995 | Scherzer .................. 235/449 |
| 5,450,491 | A | | 9/1995 | McNair |
| 5,455,248 | A | | 10/1995 | Parks et al. |
| 5,493,105 | A | | 2/1996 | Desai |
| 5,523,794 | A | | 6/1996 | Mankovitz et al. |
| 5,528,248 | A | | 6/1996 | Steiner et al. |
| 5,530,232 | A | * | 6/1996 | Taylor ..................... 235/380 |
| 5,585,787 | A | | 12/1996 | Wallerstein |
| 5,590,038 | A | | 12/1996 | Pitroda |
| 5,594,493 | A | | 1/1997 | Nemirofsky |
| 5,748,737 | A | | 5/1998 | Daggar |
| 5,886,333 | A | | 3/1999 | Miyake |
| 6,142,369 | A | * | 11/2000 | Jonstromer .............. 235/380 |
| 6,144,848 | A | | 11/2000 | Walsh et al. |
| 6,847,816 | B1 | * | 1/2005 | Sarradin .................. 455/407 |
| 6,910,624 | B1 | * | 6/2005 | Natsuno ................... 235/379 |
| 2004/0041498 | A1 | * | 3/2004 | Sakai ....................... 310/339 |

OTHER PUBLICATIONS

Starbucks Invalidity Contention charts for patent No. 7,828,207, May 18, 2011, Case No. 10-cv-8287 Northern District of Ilinois.

Starbucks Non-infringement Contention charts for patent No. 7,828,207, May 18, 2011, Case No. 10-cv-8287 Northern District of Ilinois.

Starbucks initial non-infringment, unenforceability and invalidity contentions for patent No. 7,828,207, May 18, 2011, Case No. 10-cv-8287 Northern District of Ilinois.

Wikipedia page found at http://en.wikipedis.org/wiki/IBM Simon, or at http://www.wikipedia.com (with search on IBM Simon). Date taken from Wikipeda Apr. 16, 2013.

US 4,825,026, 04/1989, Oheta et al. (withdrawn)*

* cited by examiner

SECTION A-A

TOP VIEW

FRONT VIEW

UNIVERSAL CREDIT CARD APPARATUS AND METHOD

RELATED U.S. APPLICATION DATA

This application is a continuation application Ser. No. 12/273,485 filed Nov. 18, 2008 which is a continuation of application Ser. No. 12/015,459, filed on Jan. 16, 2008 which is continuation of application Ser. No. 11/372,254, filed on Mar. 8, 2006 which is a continuation of application Ser. No. 10/857,031, filed on May 28, 2004, which is a continuation of application Ser. No. 09/929,975, filed on Aug. 15, 2001, which is a divisional application of application Ser. No. 09/109,312 filed Jun. 30, 1998, now U.S. Pat. No. 6,308,890, which itself is a divisional application of application Ser. No. 08/802,672 filed Feb. 19, 1997, now U.S. Pat. No. 5,834,747, which is a Continuation of application Ser. No. 08/334,474 filed Nov. 4, 1994.

BACKGROUND OF THE INVENTION

The invention relates to the use of devices having information or patterns carried in or on some storage media, examples of which include photographic patterns, keys or the magnetic strip on credit cards. The invention provides for an apparatus and method allowing more than one pattern or set of information to be used with a given type of medium to facilitate use by the holder thereof with a pattern reading device and to reduce the numbers of separate information or pattern media carrying devices which must be used, Other uses and purposes for the present invention will also become known to one skilled in the art from the teachings herein.

1. Field of the Invention

The field of the invention includes the storage and use of information or patterns on or in operator usable medium, examples including credit cards, keys, holograms, photographs and the like, by use of various magnetic, electronic, optical and mechanical devices. Such information or patterns may be known, unknown, ordered or random, coherent or incoherent, there being no restriction on the types or nature of information or patterns with which the invention may be used. The operators may be human, animal or otherwise, and may involve different operators of different persons or types at various times.

2. Description of the Prior Art

It is well known to store particular information or patterns such as account numbers, bar codes, security codes, etc. on magnetic and optical storage medium embedded in small, sturdy and relatively inexpensive carriers such as credit cards. FIG. 1 shows for example a prior art credit card diagram having a strip of magnetic material 2 which is embedded in a plastic substrate 1 which magnetic strip carries a pattern of magnetization which is a magnetic representation of information or patterns relating to the credit card. FIG. 1 is shown in graphical form with the top and front edge view of the magnetic strip with a representation of the magnetic flux pattern recorded therein.

OBJECTS AND DISCLOSURE OF THE INVENTION

The invention described herein provides for a method and apparatus whereby a plurality of sets of patterns or information may be stored and utilized by a user. The invention allows access to numerous accounts, services, features, etc. with just one storage device, thereby eliminating the need to carry, store, remember or retain numerous data storage devices, data sets or patterns. Examples of applications for the present invention include the magnetic pattern information of a plurality of credit cards which may be stored in a single convenient card which a user may carry in order to replace a plurality of individual credit cards, programmable optical patterns such as bar codes or photographic patterns utilized for security applications and programmable key patterns which may be changed to accommodate different locks of mechanical, optical or electronic type.

The invention is useful with any sort of storage medium related to pluralities of sets of information, data or patterns which are desired to be used by a user. For example the invention may be used with mechanical, magnetic, electrical, optical, film, holographic or other recording or storage of information or patterns as will become apparent to one skilled in the art from the teachings given herein. The invention thus provides simulation of multiple sets of data, information or patterns stored in a spatial pattern by providing a memory or storage device for storing data from which the spatial patterns may be reconstructed. Also included is a programmable spatial device capable of reconstructing the spatial patterns under control of a circuit responsive to an external inputs which cause the programmable spatial device to be programmed to reconstruct the spatial patterns from the data stored in the memory. The spatial patterns may take on multiple dimensions and may be time varying and the memory may be electronic, mechanical, optical or other type as will be apparent to one of ordinary skill in the art from the teachings herein.

DESCRIPTION OF THE PREFERRED EMBODIMENT

Figure 1:
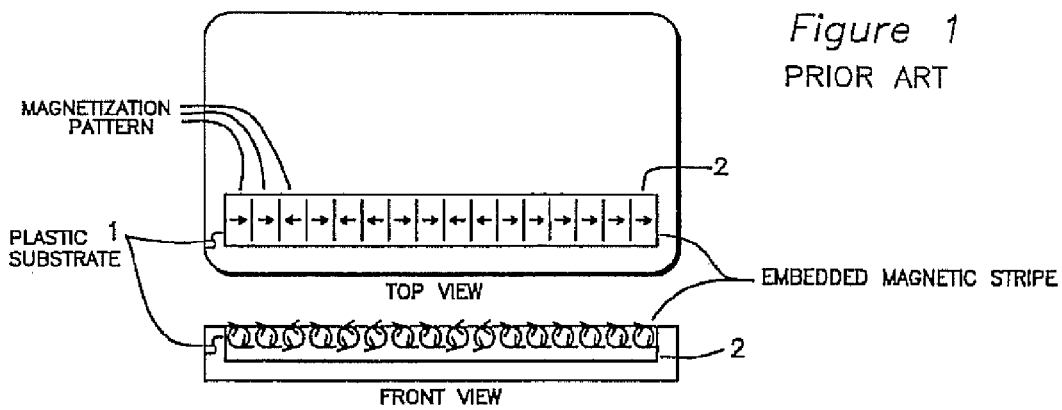
FIG. 1 is a drawing demonstrating a prior art credit card with a magnetic stripe.

FIG. 1 is a drawing demonstrating a prior art credit card in diagram form, having a strip of magnetic material 2 which is embedded in a plastic substrate 1 which magnetic strip carries a pattern of magnetization which is a magnetic representation of information or patterns relating to the credit card. FIG. 1 shown in graphical form the top and front edge view of the magnetic strip with a representation of the magnetic flux recorded therein.

Figure 2:
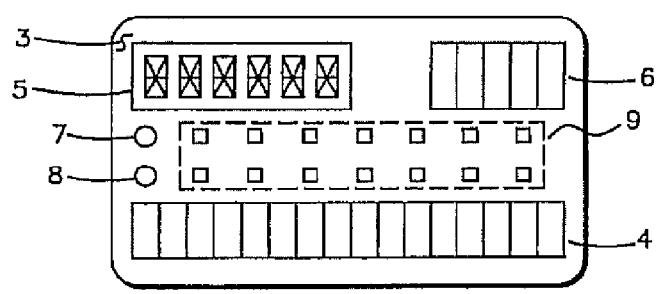
FIG. 2 is a drawing demonstrating the preferred embodiment of the present invention.

FIG. 2 shows a diagram of the preferred embodiment of the present invention, dubbed a multi-card by the inventor, having a plastic substrate 3, on which is suitably mounted a programmable magnetic strip 4, an LCD display 5, a solar cell power source 6, including an electricity storage cell (not shown), an infrared emitter 7, and infrared sensor 8, and a key pad 9 consisting of 14 operator actuated switches. It will be appreciated that these switches may be capacitive type touch sensitive sensors or other types. It will be understood that the programmable magnetic strip 4 may also be of a type which may sense magnetic information or patterns, and thus may be used as an input or output device.

Programmable magnetic strip 4 is preferred to be operated to approximate, duplicate or replicate a magnetic pattern matching the particular need of the operator in response to the operator's commands or inputs to the card as will be described in more detail below.

In operation, the multi-card has stored in it several sets of data corresponding to account related information or patterns for different credit cards, identification cards and the like. Power for the operation of the device is provided by a solar cell, which power is stored in a storage battery. The battery is preferred to be replaceable with a charged battery for those applications where the solar cell does not receive enough light to operate the multi-card, however it is preferred that devices which make use of the multi-card provide sufficient illumination to the solar cell to power the device.

To operate the multi-card, the operator simply presses a given key, which may be a touch sensitive pad, which causes multi-card to activate and the display 5 to display which account is associated with that key. If the operator forgets which key is associated with a wanted account, he may simply operate all keys in sequence until the correct account is selected. It will be understood that it is also possible to provide only one key, with a different account called up for each press.

When each account is called, the magnetic data for that account is loaded into the magnetic strip 4, causing the magnetic strip to simulate the magnetic strip on the prior art type card by emulating, approximating, replicating or duplicating the magnetic pattern, depending on the accuracy required by the device reading the pattern. The control of the accuracy provided may be provided by the operator, or may be automatic in response to feedback (or lack thereof) by the device using the card. In this fashion, the multi-card may then be placed into a card reader or other device which reads the magnetic pattern from the magnetic strip to allow the holder access to the account, services or features associated with the stored data or pattern.

Figure 8:
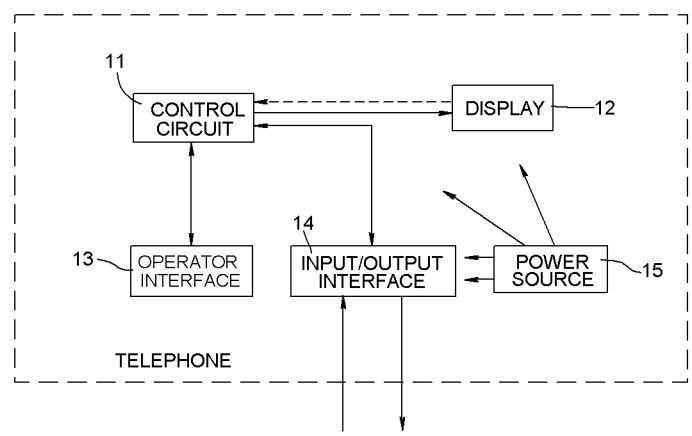
FIG. 8 shows a telephone embodiment of the present invention.

It will be recognized by one of ordinary skill in the art from the teachings herein that the invention allows access to numerous accounts, services, features, etc. with just one card thereby eliminating the need to carry, store or retain numerous cards. Other features may be combined with the invention as well, or as the case may be the invention may be combined with other functions, examples including personal reminder and memory capability, calculator and clock or even telephone (shown in FIG. 8) and television functions.

Other sequences of operation of the invention may be utilized as well. For example, the key pad may be used to enter a convenient select designator, for example a BC representing bank card or a PBC indicating personal bank card, or any other convenient select designator. The select designator will then cause the account identifier to be displayed on 5 and the proper pattern loaded into 4. In addition, the loading of pattern into 4 may be caused to occur only when another command is generated by the operator, or only upon or after insertion of the card in a device which uses it. These operations are considered to be novel features of the invention.

It will be understood by one of ordinary skill in the art that elements 3 and 5-9 are well known and commonly found and utilized in the industry and may be controlled by a microprocessor with their application and use in the preferred embodiment of the invention being within the capability of one of ordinary skill in the art.

Figure 7:
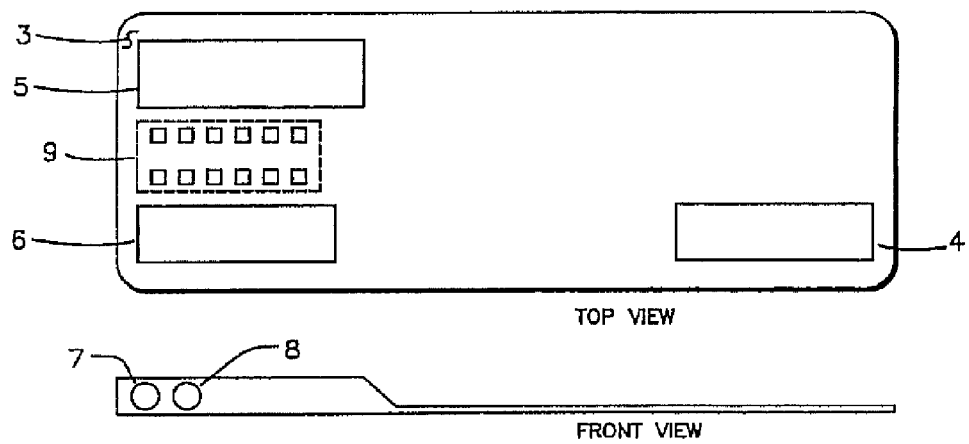
FIG. 7 is a drawing showing another mechanical configuration of the preferred embodiment of FIG. 2.

FIG. 7 shows an top and side views of an alternate mechanical embodiment similar to FIG. 2. The mechanical embodiment of FIG. 7 has the advantage of allowing a larger space for the electronics while maintaining a thin cross section in the "card" area, thus allowing easier fabrication.

Figure 3:
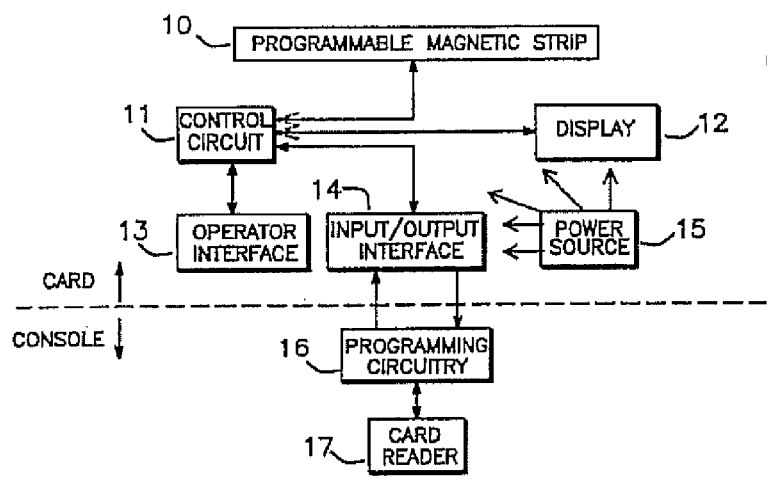
FIG. 3 is a drawing explaining the operation of the preferred embodiment of the invention.

FIG. 3 shows a diagram of the multi-card and a supporting console which may be used to store information or patterns in the multi-card or recover information or patterns from the multi-card, or another card. A control circuit 11, which is preferred to be a microprocessor such as an Intel 80C31 or which may have internal ROM, ram and nonvolatile ram as is known in the industry, is utilized to control and operate the various elements of the multi-card.

As an example the Intel 80C31 series microcontroller is well suited to the control task. When the 80C31 is coupled with a nonvolatile ram such as the Xicor X2444 available from Xicor, Inc. 1511 Buckeye Drive, Milpitas, Calif., a keypad such as can be easily constructed with the ITT Schadow KSA1M211 switch available from ITT Schadow Inc. 8081 Wallace Rd., Eden Prairie, Minn., and an LCD display such as the Optrex DMC20261NY-LY-B, available from 44160 Plymouth Oaks Blvd., Plymouth, Mich., the invention components may be readily constructed. A 16 keypad matrix in 4.times.4 form (not all 16 need be used) is preferably configured on the 8 P1 port connections, the LCD is preferably configured on the P0 data port under write control as addressed by the P2 data port and controlled by the /WR control. The input/output interface 14 is preferably provided via the TXD/RXD serial ports (alternate functions provided on the P3 port), and the nonvolatile ram is preferably configured directly to the /INT0, /INT0I and T0 pins of the P3 port. The program instructions to run the processor are preferably stored in an EPROM having data pins coupled to the P0 port and addressed by the P2 port under /RD read control as is commonly known in the industry. Intel provides a wealth of information on configuring, programming and operating this and many other processors, which information is available from Intel Corporation, 3065 Bowers Ave., Santa Clara, Calif.

The programmable magnetic strip 10 is preferred to contain multiple inductive coils to generate magnetic fields in response to current flowing therein, as will be described in more detail below. The connection of the processor of 11, be it an 80C31 or other type may be made directly via matrixing of the two connections of the individual coils in 10, for example as is commonly done to write (and read from) core type magnetic memory in the computer industry. Alternately, a large serial shift register array may be loaded with serial binary data under control of 11 with the array's output being enabled to a low impedance state from a high impedance state after loading. The binary data may thus cause the many parallel outputs, each of which is coupled to a coil, to source electrons into the coil, or sink electrons from the coil, providing that the other end of each coil is connected to a voltage source which is midway between the output's high and low logic level states. To achieve control over the current flow through the coils, multiple serial shift registers may be utilized, with several outputs being coupled to each coil through resistors or other current controlling circuits, the pattern of data in the several outputs controlling the current flow.

Several variations of the suggested elements of the preferred embodiment may be utilized as will be convenient to implement particular embodiments of the invention which may be configured to specific needs and applications, as will be apparent to one of ordinary skill in the art from the teachings herein.

The substrate 3 may be of any material on or to which the other elements may be suitably secured or attached, examples including the preferred PVC plastic, ceramic, metal and others. Display 5 which is used to provide messages to the user of the device may be of any electro optical type such as LCD, LED, CRT, incandescent, fluorescent, flip dot, etc. or may be of electro mechanical type such as beeper, buzzer, vibrator, etc., or may be eliminated in applications where it is not desired to convey messages to the user, or where messages are conveyed via other means. Such other means for example include via the device which reads the magnetic strip 4.

Power source 6 may be any well known power source, such as solar cell, battery, electric generator operating to convert motion to electricity, fuel cell, electromagnetic or electric field receiver, piezoelectric generator, etc. or any combination thereof.

Emitter 7 may be the preferred infrared LED, antenna, coil, transducer, or any other device capable of conveying information or patterns from the invention to outside devices, and receiver 8 is preferred to be a photo transistor but may also be any such apparatus or device capable of receiving information or patterns from outside devices to be used by the invention. Either or both of the emitter and receiver may be eliminated if the capability provided is not desired, or is otherwise provided for. For example, the sensing capability of 10 or the input capability of 13 may be utilized to provide the receiver 8 function and the display 12 may be utilized to provide the emitter function.

Touch sensitive key pad 9 may be capacitive, heat sensing, optical or mechanical switches, etc. or any device capable of receiving and coupling operator input to the invention. The operator interface 13 and its key pad 9 may also be eliminated if no operator interface is desired.

The control circuit operates with the programmable magnetic strip 10, examples include those corresponding to 4 of FIG. 2, to create a predetermined magnetic pattern which may be read by compatible reading devices, and may also operate in conjunction with 10 to sense magnetic patterns. Control circuit 11 also drives the LCD display 12, examples including associated with 5 of FIG. 2, to display messages to the operator and as signified by the dotted arrow on the control circuit 11 may also operate interactively with 12. Control circuit 14 operates interactively with the input/output interface 14, examples including those associated with 7 and 8 of FIG. 2, to communicate with the console. Control circuit 11 also operates interactively with operator interface 13, examples including those corresponding to 9 of FIG. 2, to allow operator input to the control circuit. Also shown in FIG. 3 is a power source 15, examples including those associated with 6 of FIG. 2, and which provides power for the operation of the multi-card. In the preferred embodiment, 15 includes a replaceable nickel cadmium battery and solar cell allowing the battery to be replaced and/or recharged. It is of course possible to use either replaceable or rechargeable power sources.

FIG. 3 includes a console comprised of programming circuitry 16 and card reader 17. In operation, the card reader may be operated to read information or patterns from a particular data storage medium, examples including the magnetic strip on a credit card. The information or patterns may be read as the actual data represented in any of its various forms, or may be read simply as the representation. With respect to reading a magnetic stripe, the reader may simply read the magnetic pattern without concern as to the data represented thereby, or may decode the magnetic pattern into the encoded (that is represented) data, or may decode the data to the unencoded (that is unprotected by security scrambling and the like) data as is convenient. In the preferred embodiment, the magnetic pattern is simply sensed at a high resolution by moving the magnetic strip over a magnetic sensor and generating a binary representation of the polarity of the magnetic field in response thereto. The resulting binary pattern corresponds to the magnetic polarity field, in the preferred embodiment at 0.001 inch increments, giving a linear "snapshot" of the magnetic pattern.

The binary representation is then coupled to the programming circuitry 16 (via 14) where an account identifier is associated therewith to later be displayed on the display 12 when the wanted corresponding magnetic pattern is recalled from the memory in the control circuit 11. While called an account identifier, there is no need that the pattern correspond in any way to an account, and may well correspond to anything. The account identifier may be thought up by the operator, may be chosen by the operator from a list or other source, or may be assigned without operator intervention, for example preprogrammed in the card which is read or in the control circuit 11. The input of the account identifier may be via 13 or 16 as is desired. It is however preferred that the operator may have some choice in the matter in order that an account identifier which is either convenient to or associated by the operator is used, and thus it is preferred that 16 contain a keyboard with which the operator may type in his desired identifier, and the desired key, key sequence or location associated therewith.

It is also preferred to associate a select designator with the binary representation, in order to allow the operator to utilize the select designator to call up a particular magnetic pattern. The select designator may be thought up by the operator, may be chosen by the operator from a list or other source, or may be assigned without operator intervention, for example preprogrammed in the card which is read or preprogrammed in the control circuit 11 at the time of manufacture or other time.

In operation, it is preferred that there be more than one method for the operator to call up a wanted pattern. One preferred way is for the operator to enter the select designator. This causes the account identifier to be displayed in 12. Alternatively, the operator may scroll through all the possible sets of data, viewing each account identifier as it appears until the desired one is called up, or may key in a more detailed pattern, to call up the desired account.

The magnetic pattern (or data represented thereby in some form) is then caused to be stored in the memory of 11 in a form which allows it to be associated with the identifier, and preferably also with some known input terminal or sequence of terminals of 9. In the preferred embodiment, the operator chooses an available key of 9 (for example the upper right) or other select designator, provides an account identifier, (for example BANK CARD) and the operator choices and data are stored in 11 in a fashion which associates them all. It is preferred that the data be stored in nonvolatile memory in order that it will be retained in the event that the power storage device of 15 is fully discharged or the control circuit is turned off, for example to save power.

It is preferred that by utilizing the foregoing programming procedure, the operator stores the magnetic pattern, account identifier and desired associated select designator in 11. Upon subsequent entry of the associated select designator, the control circuit 11 recalls the associated data corresponding to the magnetic pattern and the account identifier from memory. The account identifier is loaded in the display 12 to remind the operator what the data is associated with, and the magnetic pattern is caused to be replicated in 10 from the stored data. The replicated magnetic pattern in 10 may then be utilized to operate a card reading device to provide the operator access to the account, services, features or other conveniences associated therewith, and hence associated with the card which was read by 17.

It is of course desired to provide the capability of storing several such sets of associated data, identifier and key in the memory of 11, and it is further desirable to provide for the association of multiple select identifiers with a given set of data. By way of example, in this fashion, a set of data for generating a magnetic pattern for a company issued bank card may be called up by use of any of the select identifiers cc, or COCARD or COMPANY CARD, etc. and another set of data for a personal bank card may be called up by use of any of the select identifiers PC, PBC, etc.

Figure 4:
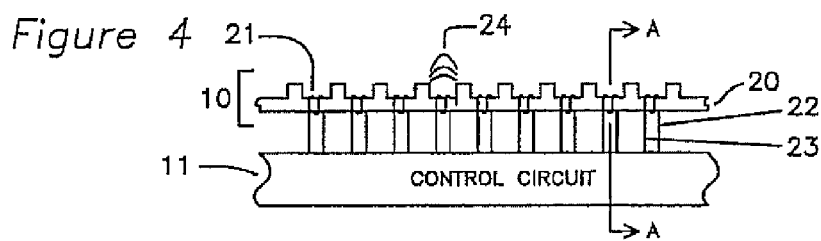
FIG. 4 is a drawing showing details of the programmable magnetic strip of the preferred embodiment of the invention.

FIG. 4 shows a diagram of the details of the magnetic strip 10 and control circuit 11, including individual electromagnet coils, one of which is shown as 21 and having electric circuit connections 22 and 23, and magnetic flux conducting material 20. It will be recognized that by passing an electric current through a given coil that a magnetic flux will be created across the associated gap in the magnetic flux conducting material 20 above the coil, such as is represented by 24. Furthermore, the flux for each coil will be largely contained in the gap corresponding to that coil by the magnetic flux conducting material. The polarity of the flux may of course be changed by changing the direction of current flow through the coil, and the intensity of the magnetic flux may be varied by varying the electric current through the coil. In this fashion, the original magnetic pattern which was read by reader 17 may be approximated, duplicated or replicated as required. While it may be desirable to cause the control circuit 11 to have the ability to vary the accuracy with which it stores the magnetic data or programs the magnetic strip, it will be recognized that this is not a requirement, and 11 may simply operate to a single given accuracy. It may also be noted that the material used for 20 may be of a type having a large magnetic memory or hysteresis so that once a magnetic pattern is generated in the material, the electric current through the coils may be turned off or reduced and the magnetic field will remain. Techniques which are used to write and read magnetic core type memory, as well as the materials used therefore, will be applicable to the generation of magnetic patterns for 10, and the technology used in the core industry may be easily adapted to be used in fabricating 10. It will also be recognized that other methods of creating magnetic patterns may be utilized as well, such as various chemical, thermal and optical methods which may be utilized to create magnetic flux patterns, or to alter existing flux patterns.

Figure 5:
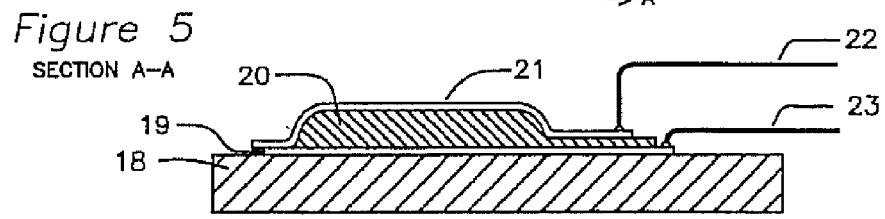
FIG. 5 is a drawing showing a cross sectional view corresponding to FIG. 4.

FIG. 5 shows a sectional diagram A-A of elements 20-23 of FIG. 4 and the preferred method of construction thereof. This method of construction is readily implemented with either photographic lithography and lamination techniques or with chemical vapor etching and deposition as are commonly utilized to fabricate miniature electronic circuits. Other construction methods may be utilized as well.

Element 18 is a substrate material, examples including plastic or ceramic, on which the magnetic coils 21 may be built. a conductive layer 19 is formed on the substrate in a predetermined pattern to make up the bottom half of the coils 21. This layer may be created by depositing or printing a continuous metallic film and then etching away all but the desired conductive paths, or by photographically printing the conductive paths. Next, the magnetic material 20 is formed on top of the bottom conductive paths. Preferable the magnetic material is an electrically non-conductive or low conductive material, but if it is conductive, an insulating layer may first be deposited to prevent it from shorting out the top and bottom conductive paths. After the magnetic material is formed the top electrically conductive layer is formed thereover using the same process as for the bottom, thus completing the coils 21. Finally, conductive wires or circuits 22 and 23 are bonded to the coils for connection to 11, and the entire magnetic strip is provided with an environmentally insulating covering if desired to shield from moisture, corrosion, etc. By utilization of this method, it will be seen that very low manufacturing cost and small size may be obtained. It will also be understood that the linear array of coils is given by way of example with respect to the preferred embodiment and may be arranged in other than a linear fashion, for example in circular or three dimensional patterns. It will also be understood that the magnetic coils may be replaced with LEDs to create emitted light patterns, or by LCD elements to create reflected or transmitted light patterns, or by any other type of energy radiator, absorber or deflector in order that the invention may be practiced with virtually any sort of emitted, absorbed or deflected pattern.

It will be recognized that while the coils may be utilized to generate a magnetic pattern, they may also be utilized to sense a magnetic pattern. While some motion is required to generate an electric current in the coils, this motion may be supplied by the user. In addition, magneto restrictive materials may also be adopted to allow sensing of magnetic patterns without motion. One of ordinary skill in the art will be able to construct such a device and practice the invention from the teachings of the preferred embodiment given herein without undue experimentation or further invention. It will also be recognized that it will be possible to have magnetic strip 10 sense the magnetic pattern on another magnetic strip directly, removing the need for card reader 17. It would also be possible to incorporate the programming circuitry 16 in the control circuit 11, thus completely eliminating the need for the console of FIG. 3. Once the console is eliminated, the input/output interface 14 may also be eliminated.

One skilled in the art will also recognize that an inexpensive version of the invention may be constructed of simply a programmable magnetic strip 10 which can both read and simulate a magnetic pattern, a control circuit 11, an elementary operator interface 13 and a power source 15.

Alternatively, instead of a magnetic strip 10 capable of reading, several preprogrammed magnetic patterns may be programmed in control circuit 11 upon manufacture, either by storage of the magnetic patterns, storage of data which may create the magnetic patterns or storage of an algorithm or method by which the magnetic pattern may be created in 10 under control of 11. In such a system, only elements 11 and 10 are absolutely required since it would be possible for 11 receive commands from the reading device via 10, or to simply try all stored patterns in 10 upon excitation or connection of the power source 15.

While the preferred embodiment of the invention has been given by way of example with respect to credit cards having magnetic strips, it will be recognized that the invention may very well be adapted for use with other methods of storage and storage medium. Examples include, simulating two or more dimension patterns. Optical devices which record data on film in two or more dimensions may be replaced by liquid crystal or other optical displays which simulate the patterns recorded on the film. Holographic recordings may also be simulated by LCD or other optical displays. Mechanical devices may be replaced by electromechanical devices in which mechanical dimensions are adjusted via solenoids, motors, piezoelectric cells or the like. Keys are an excellent example of a device which may be replaced by a battery of such adjustable devices.

Figure 6:
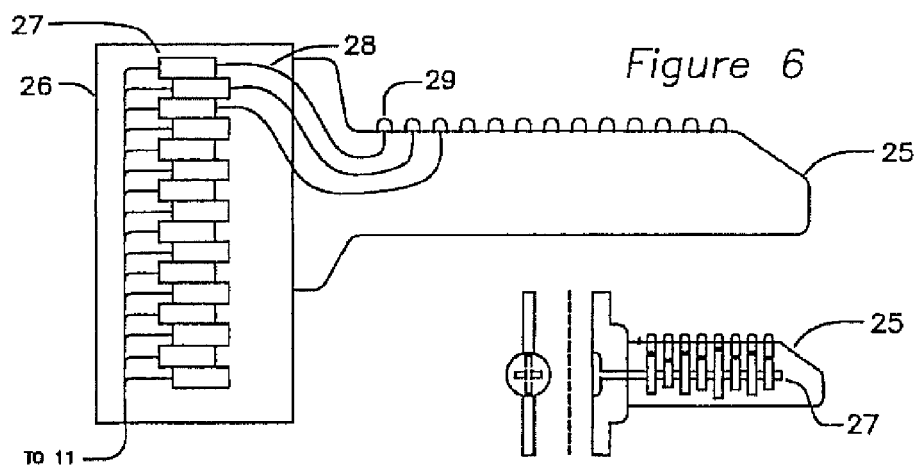
FIG. 6 is a drawing showing the invention as used with a key.

In FIG. 6 for example, the device of FIG. 3 may be utilized in conjunction with micro machines in order to create an adjustable key in which the operator selects an identifier corresponding to the particular lock which he wishes to unlock. The device uses electromagnetically driven micromotors and worm screws to adjust the serrated edge on the key to fit the lock. A sectional view of the device is shown in which a standard key blank 25 is machined to couple to a bank of micro motors or solenoids 26, each of which is connected via a worm screw to a flexible shaft or wire which extends to the serrated edge of the key.

By way of example, micromotor 27 is coupled to flexible shaft 28 which passes through a hollow portion of the key blank 25 to the serrated edge where it protrudes through the blank at 29. Individual channels may be micromachined for the flexible shafts, or the shafts may simply be sized to fill the slot in the key blank, or bundled together to prevent lateral displacement which would affect the protrusion distance from the edge of the key blank at 29. The micromotor 27, via the screw, adjusts the position of the end of 28 to thereby control the length of protrusion of the other end at 29, thus adjusting the depth of the serration at that point. All of the micrornotors in the bank 26 are coupled to the control circuit 11 of FIG. 3 by a suitable coupling. In this fashion, the key may be adjusted to fit different locks as desired by the operator. In this example, card reader 17 may be replaced with a key reader in order that the serration pattern of precut keys may be read into 11 and stored, along with account identifiers, select designators, etc. as previously described.

In view of continuing development of micro machines on silicon wafers by use of semiconductor fabrication techniques, it is envisioned that it will be possible to manufacture both electro mechanical components such as solenoids and the corresponding electrical control circuitry all on the same semiconductor substrate. In this fashion, it would be possible to manufacture the invention of FIG. 6, including the necessary control circuitry of FIG. 3 entirely with existing semiconductor fabrication technology.

It would also be convenient to replace the electronic storage of different patterns with a mechanical or other storage of patterns, for example with respect to the key of FIG. 6 on a rotating cam shaft, shown as 27 of the inset, which would be rotated to adjust the height of spring loaded pins on the key, the springs holding the pins against the cams. While the configuration of the inset would require a fairly wide key, the camshaft could also be located entirely within the handle of the key and be coupled to the spring loaded pins via flexible shafts or wires 28 as with the micromotor actuator 26. The account identifiers or select identifiers can be engraved directly on the end of the shaft. It will be understood that the flexible shafts may be arranged in other than a linear fashion, for example in circular or three dimensional patterns.

The invention described herein by way of explanation of the preferred embodiment may be practiced with numerous changes in the arrangement, structure and combination of the individual elements, as well as with substitution of equivalent functions and circuits for the elements in order to optimize the invention for a particular application, all without departing from the scope and spirit of the invention as hereinafter claimed.

What is claimed is:

1. An apparatus comprising:
   in a telephone:
      a control circuit;
      a memory coupled to the control circuit, the memory configured to store information related to at least one credit card account;
      a designator for selecting the information from the memory;
      a display coupled to the control circuit and configured to display at least part of the information upon selection of the designator; and
      an emitter coupled to the control circuit and configured to transmit a signal relating to the information, the emitter comprising at least one of an antenna, coil, a transducer, the display, and an infrared LED.

2. The apparatus of claim 1, further comprising a receiver configured to receive data from an external device.

3. The apparatus of claim 1, wherein the information is an account identifier.

4. The apparatus of claim 1, wherein the information is a form of data.

5. The apparatus of claim 1, wherein a plurality of sets of the information is stored in the memory.

6. The apparatus of claim 1, wherein the display is further configured to display a message.

7. The apparatus of claim 1, wherein the display is a liquid crystal display.

8. The apparatus of claim 1, wherein the display is an optical display configured to simulate a pattern.

9. The apparatus of claim 1, further comprising a touch sensitive component configured to receive an input.

10. The apparatus of claim 1, further comprising an input/output interface coupled to the emitter and the control circuit.

11. The apparatus of claim 1, wherein the at least one credit card account comprises two or more credit card accounts.

12. An apparatus comprising:
    In a telephone;
      a control circuit;
      a memory coupled to the control circuit, the memory configured to store information related to at least one identification card account;
      a designator for selecting the information from the memory;
      a display coupled to the control circuit and configured to display at least part of the information upon selection of the designator; and
      an emitter coupled to the control circuit and configured to provide a signal relating to the information, the emitter comprising at least one of an antenna, coli, a transducer, the display, and an infrared LED.

13. A telephone and credit card system comprising:
    in a telephone:
      a control circuit;
      a memory coupled to the control circuit, the memory configured to store information related to at least one credit card account;
      a designator for selecting the information from the memory;
      a display coupled to the control circuit and configured to display at least part of the information upon selection of the designator;
      an emitter coupled to the control circuit and configured to emit a signal relating to the information, the emitter comprising at least one of an antenna, coil, a transducer, the display, and an infrared LED; and
      a console configured to communicate with the control circuit and receive data to provide access to at least one of an account, a service, and a feature.

14. An apparatus comprising:
    a control circuit;
    a memory coupled to the control circuit, the memory configured to store information related to at least one credit card account;
    a designator for selecting the information from the memory;

a display coupled to the control circuit and configured to display at least part of the information upon selection of the designator; and an emitter coupled to the control circuit and configured to communicate a signal relating to the information, the emitter comprising at least one of an antenna, coil, a transducer, the display, and an infrared LED.

15. The apparatus of claim 14, wherein the apparatus is selected from the group consisting of a personal digital assistant, a calculator, a personal reminder, a clock, and a television.

16. The apparatus of claim 14, further comprising a receiver configured to receive data from an external device.

17. The apparatus of claim 14, wherein the information is an account identifier.

18. The apparatus of claim 14, wherein the information is a form of data.

19. The apparatus of claim 14, wherein a plurality of sets of the information is stored in the memory.

20. The apparatus of claim 14, wherein the display is further configured to display a message.

21. The apparatus of claim 14, wherein the display is a liquid crystal display.

22. The apparatus of claim 14, wherein the display is an optical display configured to simulate a pattern.

23. The apparatus of claim 14, further comprising a touch sensitive component configured to receive an input.

24. The apparatus of claim 14, further comprising an input/output interface coupled to the emitter and the control circuit.

25. A method comprising:
using a memory device in a telephone to store information related to at least one credit card account;
selecting the information from the memory device;
displaying at least part of the information upon selection of a designator; and
using at least one of an antenna, coil, a transducer, a display, and an infrared LED to send a signal relating to the information.

26. The method of claim 25, further comprising using a receiver configured to receive data from an external device.

27. The method of claim 25, wherein the information is an account identifier.

28. The method of claim 25, wherein the information is a form of data.

29. The method of claim 25, wherein a plurality of sets of the information is stored in the memory.

30. The method of claim 25, wherein said displaying is on a display device, the display device being further configured to display a message.

31. The method of claim 30, wherein the display is a liquid crystal display.

32. The method of claim 30, wherein the display is an optical display configured to simulate a pattern.

33. The method of claim 25, further comprising using a touch sensitive component configured to receive an input.

34. The method of claim 25, further comprising using an input/output interface coupled to a control circuit.

35. The method of claim 25 wherein the memory device and the at least one of an antenna, coil, a transducer, a display and an infrared LED is contained in a device that is selected from the group consisting of a personal digital assistant, a calculator, a personal reminder, a clock, and a television.

36. An apparatus comprising:
in a telephone;
a control circuit;
a memory coupled to the control circuit, the memory configured to store information related to at least one credit card account;
a designator for selecting the information from the memory; and
a display coupled to the control circuit and configured to display at least part of the information as an optical pattern upon selection of the designator.

37. The apparatus of claim 36, wherein the optical pattern is selected from the group consisting of a programmable optical pattern, a photographic pattern, a programmable key pattern and a pattern utilized for security applications.

38. The apparatus of claim 36, wherein the display is selected from the group consisting of a LCD, a LED, a CRT, an incandescent display, a florescent display, a flip dot display, an electromechanical display, and a holographic display.

39. The apparatus of claim 36, further comprising a power source.

40. The apparatus of claim 39, wherein the power source is one of an electric generator and a piezoelectric generator.

41. The apparatus of claim 36, wherein the optical pattern is a bar code.

* * * * *